United States Patent
Gelman et al.

(10) Patent No.: US 10,113,411 B2
(45) Date of Patent: Oct. 30, 2018

(54) BOREHOLE IMAGE GAP FILLING

(71) Applicant: SCHLUMBERGER TECHNOLOGY CORPORATION, Sugar Land, TX (US)

(72) Inventors: Andriy Gelman, Somerville, MA (US); Tuanfeng Zhang, Lexington, MA (US); Neil F. Hurley, Boston, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 131 days.

(21) Appl. No.: 14/896,961

(22) PCT Filed: Jun. 10, 2014

(86) PCT No.: PCT/US2014/041702
§ 371 (c)(1),
(2) Date: Dec. 9, 2015

(87) PCT Pub. No.: WO2014/200996
PCT Pub. Date: Dec. 18, 2014

(65) Prior Publication Data
US 2016/0130930 A1     May 12, 2016

Related U.S. Application Data

(60) Provisional application No. 61/833,300, filed on Jun. 10, 2013.

(51) Int. Cl.
*G06K 9/00* (2006.01)
*E21B 47/00* (2012.01)
(Continued)

(52) U.S. Cl.
CPC ......... *E21B 47/0002* (2013.01); *G01V 11/00* (2013.01); *G06T 7/0004* (2013.01);
(Continued)

(58) Field of Classification Search
None
See application file for complete search history.

(56) References Cited

U.S. PATENT DOCUMENTS

2005/0068036 A1   3/2005   Wang et al.
2009/0132169 A1*   5/2009   Bordakov ............... G01V 1/30
                                                                702/11
(Continued)

FOREIGN PATENT DOCUMENTS

WO   2009126881 A2   10/2009

OTHER PUBLICATIONS

International Search Report and Written Opinion issued in corresponding International Application No. PCT/US2014/041702 dated Apr. 17, 2015.
(Continued)

*Primary Examiner* — Weiwen Yang
(74) *Attorney, Agent, or Firm* — Michael Dae

(57) ABSTRACT

The present disclosure introduces methods and apparatus for acquiring a borehole image corresponding to a sidewall surface of a borehole that penetrates a subterranean formation, wherein the subterranean formation comprises structural elements and a varying geophysical characteristic. The borehole image comprises structure corresponding to the structural elements, texture corresponding to the varying geophysical characteristic, and coverage gaps (605) in which the structure and texture are missing. Trends corresponding to the structure are extracted from the borehole image. Missing structure within the gaps (605) is reconstructed based on the extracted trends. Missing texture within the gaps is simulated based on the borehole image and the reconstructed structure. A fullbore image is con-
(Continued)

structed based on the borehole image, the reconstructed structure within the gaps, and the simulated texture within the gaps.

20 Claims, 6 Drawing Sheets

(51) Int. Cl.
| | | |
|---|---|---|
| *G01V 11/00* | (2006.01) | |
| *G06T 7/00* | (2017.01) | |
| *G06T 7/40* | (2017.01) | |
| *G06T 11/00* | (2006.01) | |

(52) U.S. Cl.
CPC .............. *G06T 7/40* (2013.01); *G06T 11/003* (2013.01); *G06T 2207/30181* (2013.01)

(56) References Cited

U.S. PATENT DOCUMENTS

| | | | | |
|---|---|---|---|---|
| 2009/0262603 A1* | 10/2009 | Hurley | ................... | G01V 11/00 367/86 |
| 2010/0052687 A1 | 3/2010 | Forgang et al. | | |
| 2013/0051685 A1* | 2/2013 | Shechtman | ............. | G06T 11/60 382/218 |
| 2013/0336541 A1* | 12/2013 | Spencer Elkington | .. | G06K 9/00 382/109 |
| 2014/0149042 A1* | 5/2014 | Zhang | .................... | G01V 1/301 702/11 |
| 2014/0254884 A1* | 9/2014 | Elkington | ................ | G01V 1/42 382/109 |

OTHER PUBLICATIONS

Hurley et al., "Method to Generate Full-Bore Images Using Borehole Images and Multipoint Statistics", SPE 120671 presented at the SPE Middle East Oil and Gas Show and Conference, Bahrain, Bahrain, Mar. 15-18, 2009.

Zhang, "Filter-Based Training Pattern Classification for Spatial Pattern Simulation", Stanford, PhD Thesis, Mar. 30, 2006.

Zhang T, Switzer P, Journel AG (2006) Filter-based classification of training image patterns for spatial simulation. Mathematical Geology vol. 38, No. 1, Jan. 2006: pp. 63-80.

* cited by examiner

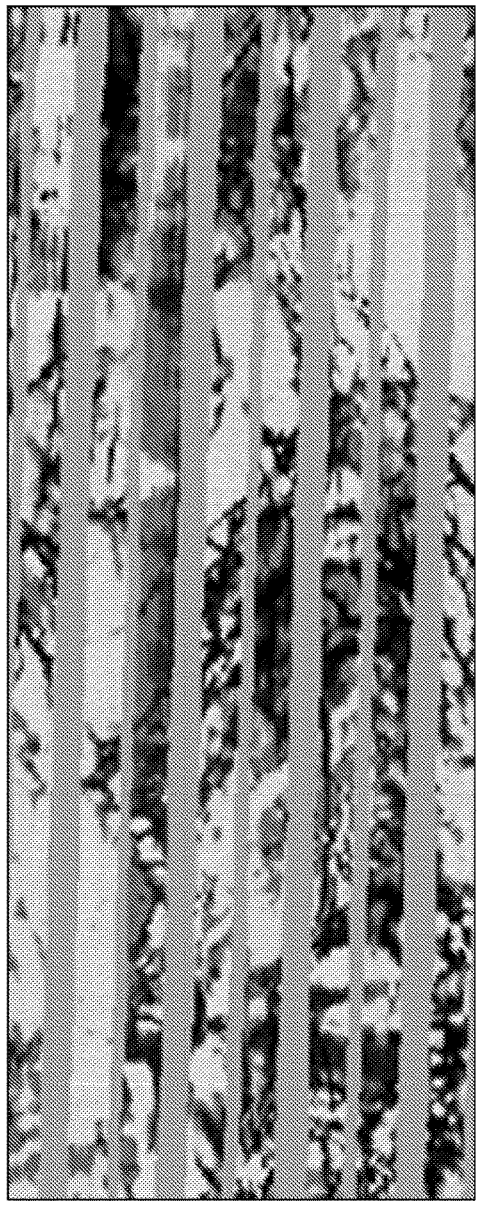 
*FIG. 10*  *FIG. 11*

BOREHOLE IMAGE GAP FILLING

CROSS-REFERENCE TO RELATED APPLICATIONS

This application claims priority to and the benefit of U.S. Provisional Application No. 61/833,300, entitled "Structure and Texture Based Fullbore Image Reconstruction," filed Jun. 10, 2013.

BACKGROUND OF THE DISCLOSURE

Borehole image logs, produced by tools lowered into a well, provide oriented electrical and acoustic maps of the rocks and fluids encountered in the borehole. Electrical borehole images in water-based (conductive) and oil-based (non-conductive) muds are generated from electrodes arranged in fixed patterns on pads that are pressed against the borehole wall. Depending on the borehole diameter, gaps will occur between the pads, resulting in non-imaged parts of the borehole wall. Thus, borehole coverage ranges between about 40% and about 80% when considering a single run of an imaging log.

SUMMARY OF THE DISCLOSURE

The present disclosure introduces a method utilizing a borehole image corresponding to a sidewall surface of a borehole that penetrates a subterranean formation. The subterranean formation includes structural elements and a varying geophysical characteristic. The borehole image includes structure corresponding to the structural elements, texture corresponding to the varying geophysical characteristic, and coverage gaps in which the structure and texture are missing. Trends subsequently extracted from the borehole image correspond to the structure, and the missing structure within the gaps is reconstructed based on the extracted trends. The missing texture within the gaps is simulated based on the borehole image and the reconstructed structure. A fullbore image is then constructed based on the borehole image, the reconstructed structure within the gaps, and the simulated texture within the gaps.

The present disclosure also introduces a method in which a downhole tool is positioned in a borehole proximate a subterranean formation penetrated by the borehole. The subterranean formation includes structural elements and a varying geophysical characteristic. The downhole tool is in communication with surface equipment disposed at a wellsite surface from which the borehole extends. At least one of the downhole tool and the surface equipment is then operated to acquire a borehole image corresponding to a sidewall surface of the borehole. The borehole image includes structure corresponding to the structural elements, texture corresponding to the varying geophysical characteristic, and coverage gaps in which the structure and texture are missing. At least one of the downhole tool and the surface equipment is then operated to extract trends from the borehole image. The trends correspond to the structure. At least one of the downhole tool and the surface equipment is then operated to reconstruct the missing structure within the gaps based on the extracted trends. At least one of the downhole tool and the surface equipment is then operated to simulate the missing texture within the gaps based on the borehole image and the reconstructed structure. At least one of the downhole tool and the surface equipment is then operated to construct a fullbore image based on the borehole image, the reconstructed structure within the gaps, and the simulated texture within the gaps.

The present disclosure also introduces an apparatus that includes a processor and memory including computer program code. The processor, the memory, and the computer program code are collectively operable to acquire a borehole image corresponding to a sidewall surface of a borehole that penetrates a subterranean formation. The subterranean formation includes structural elements and a varying geophysical characteristic. The borehole image includes structure corresponding to the structural elements, texture corresponding to the varying geophysical characteristic, and coverage gaps in which the structure and texture are missing. The processor, the memory, and the computer program code are collectively further operable to extract trends from the borehole image that correspond to the structure, reconstruct the missing structure within the gaps based on the extracted trends, simulate the missing texture within the gaps based on the borehole image and the reconstructed structure, and construct a fullbore image based on the borehole image, the reconstructed structure within the gaps, and the simulated texture within the gaps.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 10 is an example, incomplete borehole image according to one or more aspects of the present disclosure.

FIG. 11 is a fullbore image constructed from the borehole image shown in FIG. 10 according to one or more aspects of the present disclosure.

DETAILED DESCRIPTION

Figure 1:
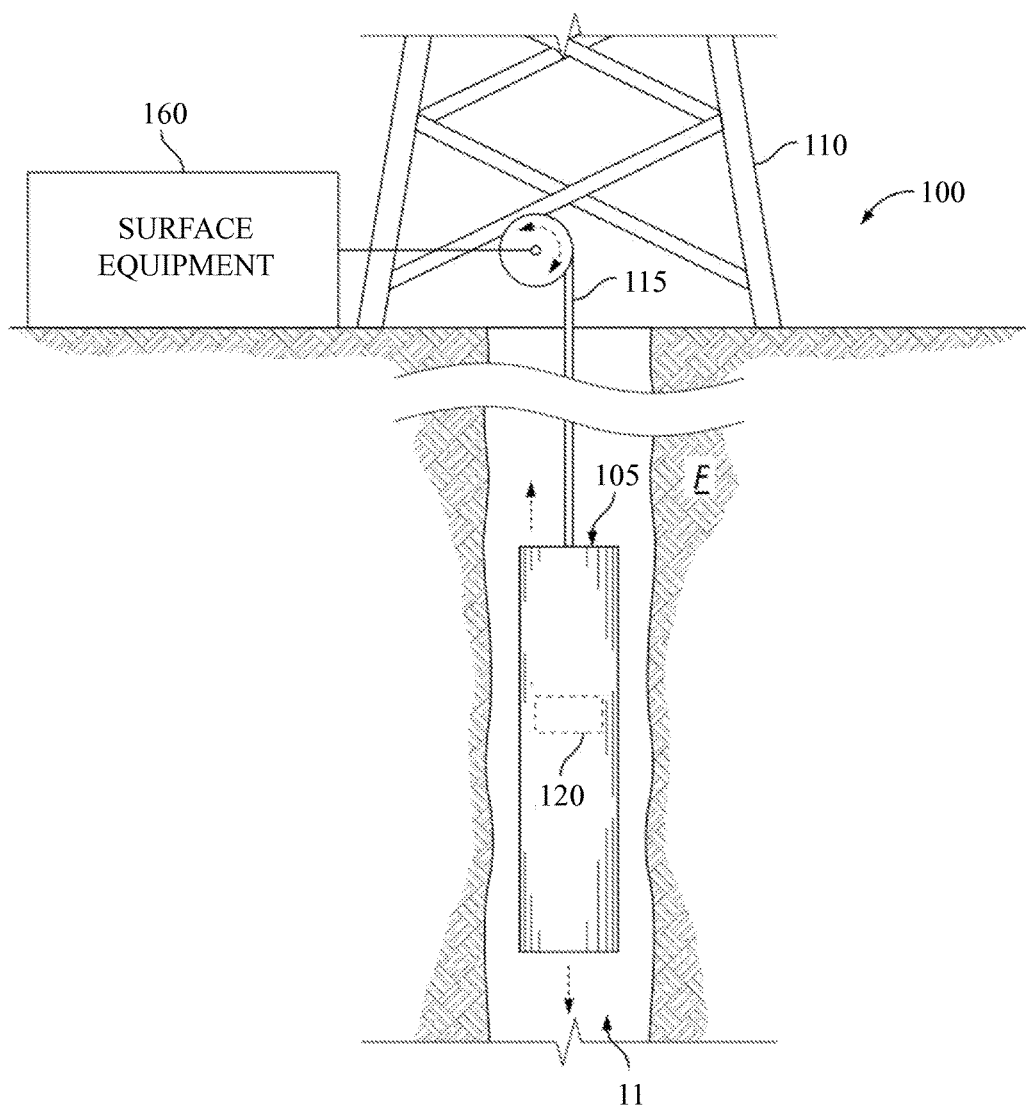
FIG. 1 is a schematic view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Fullbore Images are substantially complete, 360-degree views of a borehole wall. The present disclosure introduces one or more aspects pertaining to generating fullbore images by filling in gaps between of borehole-image logs, such as the gaps corresponding to the location of the pads of the imaging tool utilized to acquire the borehole image log.

For example, such aspects may relate to reconstructing one or more trends in the missing regions. Such trends may correspond to low pass information, and may include dips and/or other structured data. One or more of such trends may be generated by a linear combination of the pixels surrounding the gaps. Weighting associated with each pixel may be defined by image gradients, which may improve and/or ensure continuity of the reconstructed data. Given the trend (s), the texture may be estimated in the missing regions.

One or more aspects of the present disclosure may also pertain to the creation of a library utilizing the original, incomplete input image, which may then be utilized to simulate texture guided by the trend(s). Thus, gaps in the input log may be filled with patterns similar to those observed in other regions of the log.

One or more aspects of the present disclosure may be applicable or readily adaptable to a number of applications to improve borehole image interpretation. For example, fullbore images within the scope of the present disclosure may be utilized to draw closed contours around electrically resistive or non-resistive patches in a borehole wall. Fullbore images within the scope of the present disclosure may also or instead be utilized to repair logs obtained with malfunctioning electrodes and/or insufficient pad pressure. Fullbore images within the scope of the present disclosure may also or instead be utilized with automated dip picking algorithms, which otherwise may not be operable with input logs having unfilled gaps. Moreover, one or more aspects of the present disclosure may also be applicable or readily adaptable for utilization with data other than borehole images, such as with seismic data.

FIG. 1 is a schematic view of an example imaging system 100 that may be employed onshore and/or offshore according to one or more aspects of the present disclosure, representing an example environment in which one or more aspects described below may be implemented. As depicted in FIG. 1, a downhole tool 105 may be suspended from a platform, rig, derrick, and/or other wellsite structure 110 in a borehole 11 formed in one or more subterranean formations F. The downhole tool 105 may be or comprise one or more tools, one or more of which may be or comprise an acoustic tool, a conveyance tool, a density tool, an electromagnetic (EM) tool, a formation evaluation tool, a magnetic resonance tool, a monitoring tool, a neutron tool, a nuclear tool, a photoelectric factor tool, a porosity tool, a reservoir characterization tool, a resistivity tool, a seismic tool, a surveying tool, and/or a telemetry tool, although other downhole tools are also within the scope of the present disclosure. The downhole tool 105 and other downhole tools noted herein may also be interchangeably referred to herein as a borehole imager tool, borehole imaging apparatus, and the like.

The downhole tool 105 may be deployed from the wellsite structure 110 into the borehole 11 via a conveyance means 115, which may be or comprise a wireline cable, a slickline cable, and/or coiled tubing, although other means for conveying the downhole tool 105 within the borehole 11 are also within the scope of the present disclosure. As the downhole tool 105 operates, outputs of various numbers and/or types from the downhole tool 105 and/or components thereof (one of which is designated by reference numeral 120) may be sent via to a logging and control system and/or other surface equipment 160 at surface, and/or may be stored in various numbers and/or types of memory for subsequent recall and/or processing after the downhole tool 105 is retrieved to surface. The downhole tool 105 and/or one or more components 120 thereof may be utilized to perform at least a portion of a method according to one or more aspects of the present disclosure.

Figure 2:
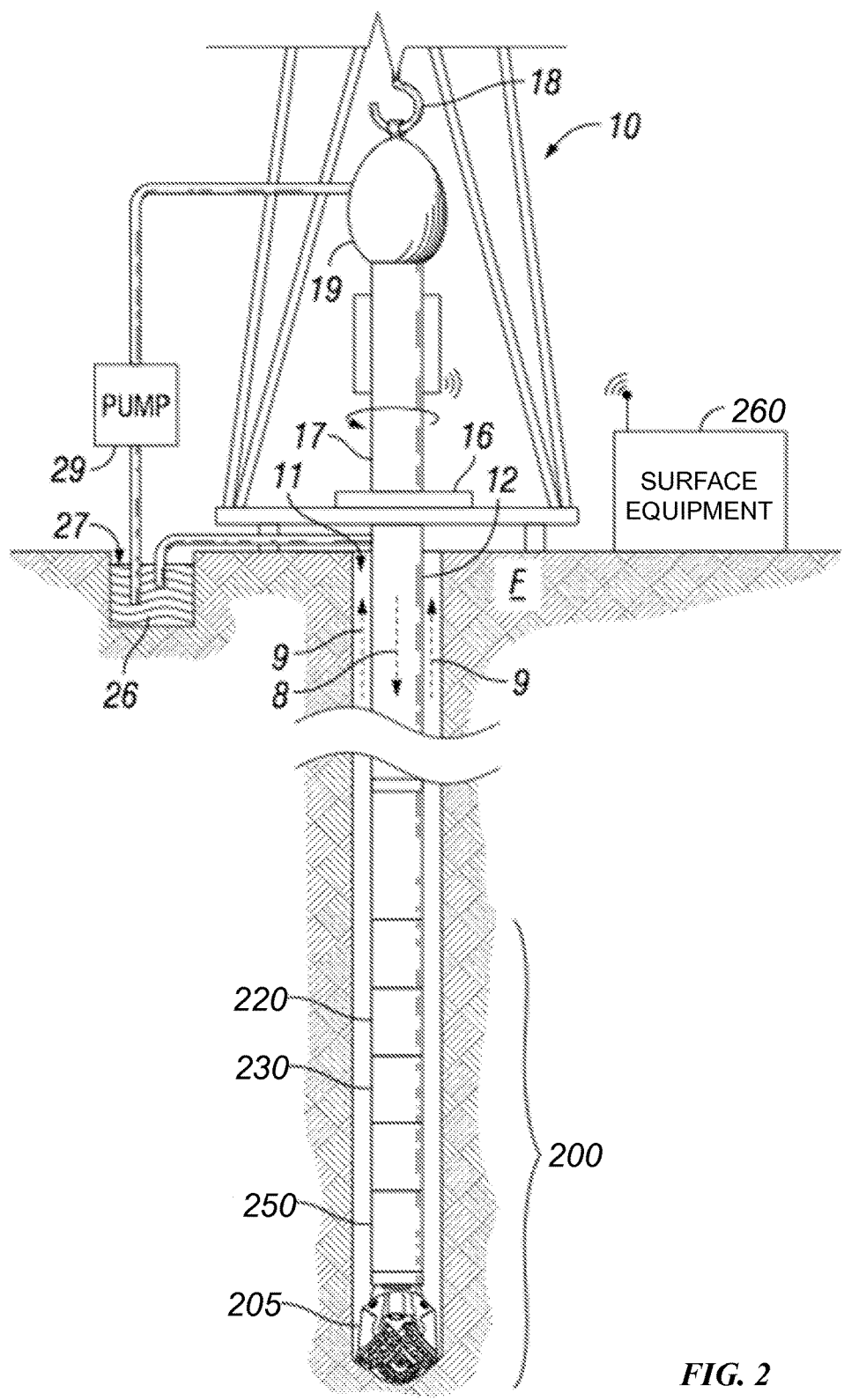
FIG. 2 is a schematic view of at least a portion of apparatus according to one or more aspects of the present disclosure.

FIG. 2 is a schematic view of an example wellsite system that can be employed onshore and/or offshore, perhaps including at the same wellsite as depicted in FIG. 1, where the borehole 11 may have been formed in the one or more subsurface formations F by rotary and/or directional drilling. As depicted in FIG. 2, a conveyance means 12 suspended within the borehole 11 may comprise or be connected to a bottom hole assembly (BHA) 200, which may have a drill bit 205 at its lower end. The conveyance means 12 may comprise drill pipe, wired drill pipe (WDP), tough logging conditions (TLC) pipe, coiled tubing, and/or other means of conveying the BHA 200 within the borehole 11.

The surface system at the wellsite may comprise a platform, rig, derrick, and/or other wellsite structure 10 positioned over the borehole 11. The wellsite structure 10 may be substantially similar or identical to the wellsite structure 110 shown in FIG. 1. The wellsite structure 10 may include a rotary table 16, a kelly 17, a hook 18, and/or a rotary swivel 19. The conveyance means 12 may be rotated by the rotary table 16, energized by means not shown, which may engage the kelly 17 at the upper end of the conveyance means 12. The conveyance means 12 may be suspended from the hook 18, which may be attached to a traveling block (not shown), and through the kelly 17 and the rotary swivel 19, which permits rotation of the conveyance means 12 relative to the hook 18. Additionally, or instead, a top drive system may be used.

The surface system may also include drilling fluid 26, which is commonly referred to in the industry as mud, stored in a pit 27 formed at the wellsite. A pump 29 may deliver the drilling fluid 26 to the interior of the conveyance means 12 via a port (not shown) in the swivel 19, causing the drilling fluid to flow downwardly through the conveyance means 12, as indicated by directional arrow 8. The drilling fluid 26 may exit the conveyance means 12 via ports in the drill bit 205, and then circulate upwardly through the annulus region between the outside of the conveyance means 12 and the wall of the borehole 11, as indicated by directional arrows 9. The drilling fluid 26 may be used to lubricate the drill bit 205 and/or carry formation cuttings up to the surface as it is returned to the pit 27 for recirculation. Although not pictured, one or more other circulation implementations are also within the scope of the present disclosure, such as a reverse circulation implementation in which the drilling fluid 26 is pumped down the annulus region (i.e., opposite to directional arrows 9) to return to the surface within the interior of the conveyance means 12 (i.e., opposite to directional arrow 8).

The BHA 200 may include various numbers and/or types of downhole tools, schematically depicted in FIG. 2 as downhole tools 220, 230, and 250. One or more of the downhole tools 220, 230, and 250 may be or comprise an acoustic tool, a density tool, a directional drilling tool, a drilling tool, an EM tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition (TLC) tool, although other downhole tools are also within the scope of the present disclosure. One or more of the downhole tools 220, 230, and 250 may be utilized to perform at least a portion of a method according to one or more aspects of the present disclosure.

The downhole tools 220, 230, and/or 250 may be housed in a special type of drill collar, as it is known in the art, and may include capabilities for measuring, processing, and/or storing information, as well as for communicating with the other downhole tools 220, 230, and/or 250, and/or directly with a logging and control system and/or other surface equipment 260. Such communication may utilize one or more conventional and/or future-developed two-way telemetry systems, such as may be or comprise a mud-pulse telemetry system, a wired drill pipe telemetry system, an electromagnetic telemetry system, and/or an acoustic telemetry system, among others within the scope of the present disclosure. One or more of the downhole tools 220, 230, and/or 250 may also comprise an apparatus (not shown) for generating electrical power for use by the BHA 200. Example devices to generate electrical power include, but are not limited to, a battery system and a mud turbine generator powered by the flow of the drilling fluid.

Figure 3:
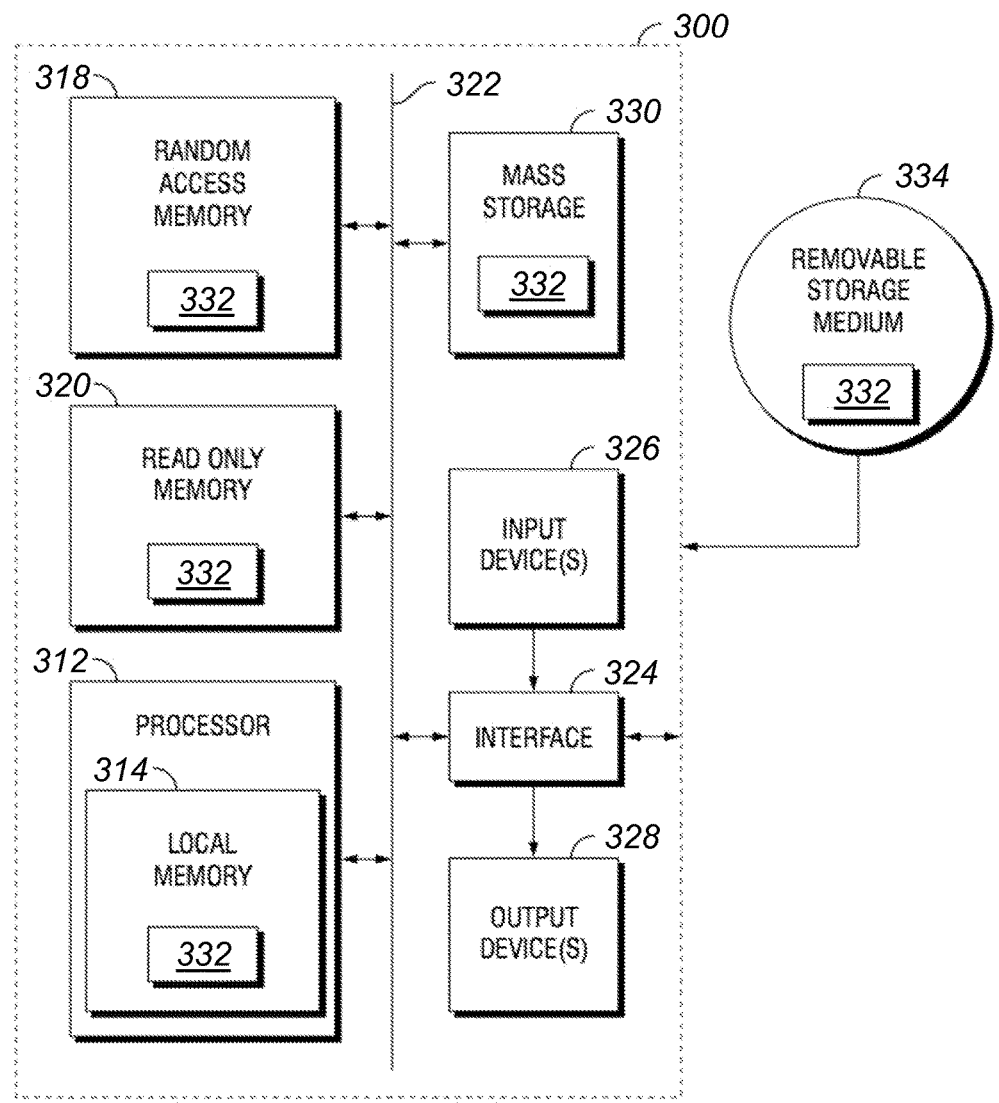
FIG. 3 is a schematic view of at least a portion of apparatus according to one or more aspects of the present disclosure.

FIG. 3 is a block diagram of an example processing system 300 that may execute example machine-readable instructions used to implement one or more of the methods and/or processes described herein, and/or to implement at least a portion of one or more of the example downhole tools described herein. The processing system 300 may be at least partially implemented in one or more of the downhole tools 105 and/or components 120 shown in FIG. 1, in one or more of the downhole tools 220, 230, and/or 250 shown in FIG. 2, in one or more surface equipment components (e.g., the logging and control system and/or other surface equipment 160 shown in FIG. 1, the logging and control system and/or other surface equipment 260 shown in FIG. 2, and/or one or more components thereof), and/or in some combination thereof. The processing system 300 may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s).

The system 300 comprises a processor 312 such as, for example, a general-purpose programmable processor. The processor 312 includes a local memory 314, and executes coded instructions 332 present in the local memory 314 and/or in another memory device. The processor 312 may execute, among other things, machine-readable instructions to implement the methods and/or processes described herein. The processor 312 may be, comprise or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 312 is in communication with a main memory including a volatile (e.g., random access) memory 318 and a non-volatile (e.g., read-only) memory 320 via a bus 322. The volatile memory 318 may be, comprise, or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 320 may be, comprise, or be implemented by flash memory and/or any other desired type of memory device. One or more memory controllers (not shown) may control access to the main memory 318 and/or 320.

The processing system 300 also includes an interface circuit 324. The interface circuit 324 may be, comprise, or be implemented by any type of interface standard, such as an Ethernet interface, a universal serial bus (USB) and/or a third generation input/output (3GIO) interface, among others.

One or more input devices 326 are connected to the interface circuit 324. The input device(s) 326 permit a user to enter data and commands into the processor 312. The input device(s) may be, comprise or be implemented by, for example, a keyboard, a mouse, a touchscreen, a track-pad, a trackball, an isopoint and/or a voice recognition system, among others.

One or more output devices 328 are also connected to the interface circuit 324. The output devices 328 may be, comprise, or be implemented by, for example, display devices (e.g., a liquid crystal display or cathode ray tube display (CRT), among others), printers and/or speakers, among others. Thus, the interface circuit 324 may also comprise a graphics driver card.

The interface circuit 324 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 300 also includes one or more mass storage devices 330 for storing machine-readable instructions and data. Examples of such mass storage devices 330 include floppy disk drives, hard drive disks, compact disk drives and digital versatile disk (DVD) drives, among others.

The coded instructions 332 may be stored in the mass storage device 330, the volatile memory 318, the non-volatile memory 320, the local memory 314 and/or on a removable storage medium, such as a CD or DVD 334.

Instead of implementing the methods and/or apparatus described herein in a system such as the processing system of FIG. 3, the methods and or apparatus described herein may be embedded in a structure such as a processor and/or an ASIC (application specific integrated circuit).

Borehole images may provide geological insight related to production planning, such as may be utilized to maximize the hydrocarbon potential of one or more subterranean formations. The accuracy of such information may depend on the resolution and coverage of the borehole image. The apparatus shown in one or more of FIGS. 1-3 and/or otherwise within the scope of the present disclosure may be operable to obtain such borehole images. One such example, the borehole image 400 shown in FIG. 4, may be obtained via operation of the FMI FULLBORE FORMATION MICROIMAGER (referred to herein as "FMI") available from SCHLUMBERGER. The FMI and/or other borehole imager tools may be, comprise, and/or or be operable in conjunction with at least a portion of the apparatus shown in one or more of FIGS. 1-3 to obtain the example borehole image 400 shown in FIG. 4. The FMI or a similar borehole imaging apparatus may be, comprise, or be utilized in conjunction with at least a portion of the downhole tool 105, component 120, and/or surface equipment 160 shown in FIG. 1. The FMI or a similar borehole imaging apparatus may also or instead be, comprise, or be utilized in conjunction with at least a portion of the downhole tool 220, the downhole tool 230, the downhole tool 250, the BHA 200, and/or the surface equipment 260 shown in FIG. 2. The FMI or a similar borehole imaging apparatus may also or instead be, comprise, or be utilized in conjunction with at least a portion of the apparatus 300 shown in FIG. 3.

Borehole imaging apparatus may be operable to obtain borehole images with an image resolution of about 0.2 inches (or about 5.1 millimeters) in the axial and azimuthal directions, although other values are also within the scope of the present disclosure. For example, the FMI and/or other borehole imaging apparatus within the scope of the present disclosure may be operable to obtain resistivity measurements using four pads that each press against the sidewall of the borehole, thus contacting the formation. However, even if another number of pads (other than four) may be utilized within the scope of the present disclosure, the pads may not fully cover the circumference of the borehole, resulting in gaps 410 circumferentially spaced apart within the borehole image 400. For example, the FMI and/or other borehole imaging apparatus within the scope of the present disclosure may be operable to obtain a borehole image having about 80% coverage in a borehole having a diameter of about eight inches (or about 20 centimeters), and the coverage decreases as the diameter of the borehole increases.

Figure 4:
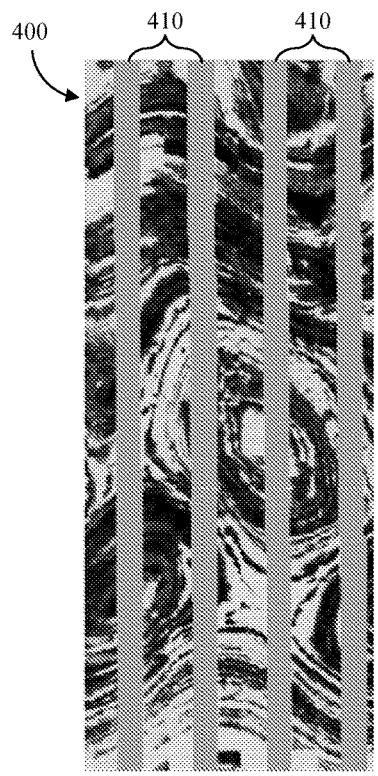
FIG. 4 is an example, incomplete borehole image according to one or more aspects of the present disclosure.

The example borehole image 400 shown in FIG. 4 is of a laminated formation, such as the formation F shown in FIGS. 1 and/or 2. The gaps 410 of missing data in the borehole image 400 may complicate reservoir evaluation processes utilizing the image 400. However, the present disclosure introduces one or more aspects that may be utilized to fill in the gaps 410 based on real measurements, for example, such as to obtain a substantially seamless 360-degree reconstruction of a fullbore image based on the input borehole image 400. For example, FIG. 5 depicts an extracted trend map 420 of the laminated formation corresponding to the borehole image 400 shown in FIG. 4, which may be utilized to reconstruct a fullbore image 430 as depicted in FIG. 6.

Figure 5:
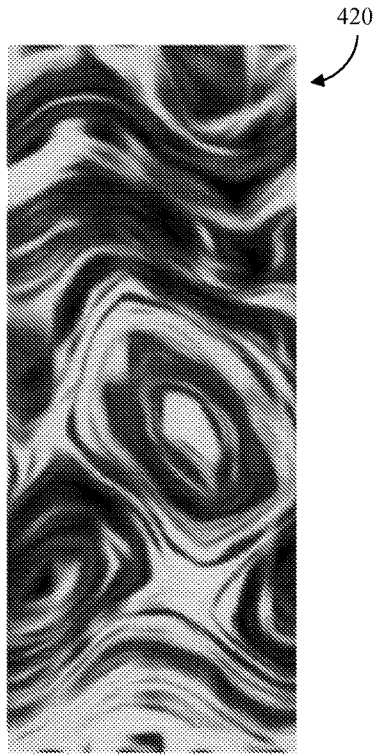
FIG. 5 is an example trend map extracted from the borehole image shown in FIG. 4 according to one or more aspects of the present disclosure.
Figure 6:
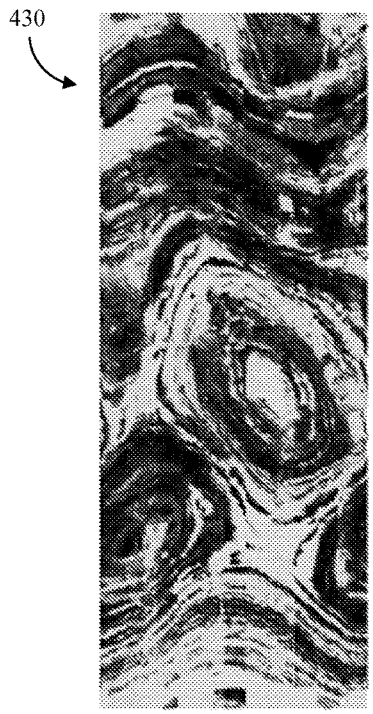
FIG. 6 is a fullbore image constructed from the borehole image shown in FIG. 4 according to one or more aspects of the present disclosure.

The example gap filling depicted in FIGS. 4-6 is based on reconstruction of structure (e.g., dips) and texture. Surface reconstruction may aid in the identification of high pay zone regions, such as laminated sandstone-shale, and texture may aid in the estimation of formation porosity.

Figure 7:
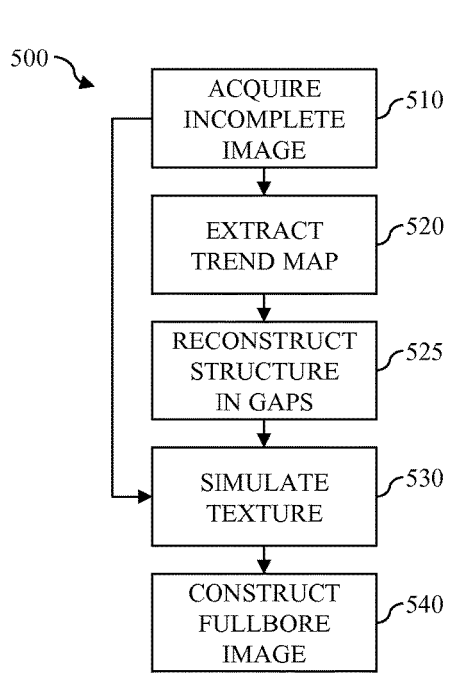
FIG. 7 is a flow-chart diagram of at least a portion of a method according to one or more aspects of the present disclosure.

For example, FIG. 7 is a flow-chart diagram of at least a portion of a method (500) for performing such fullbore image reconstruction according to one or more aspects of the present disclosure. At least a portion of the method (500) may be performed via operation of at least a portion of the downhole tool 105, component 120, and/or surface equipment 160 shown in FIG. 1, and/or at least a portion of the downhole tool 220, the downhole tool 230, the downhole tool 250, the BHA 200, and/or the surface equipment 260 shown in FIG. 2, including where such apparatus comprise at least a portion of the apparatus 300 shown in FIG. 3, whether disposed downhole, at surface, or a combination thereof.

The method (500) may comprise acquiring (510) the incomplete borehole image, which may include operation of at least a portion of the apparatus shown in one or more of FIGS. 1-3 and/or otherwise obtaining a borehole image, such as the borehole image 400 with gaps 410 shown in FIG. 4. Such acquisition (510) may also or instead comprise acquiring measurement data representative of or otherwise corresponding to an incomplete borehole image, whether such measurements were performed as part of the method (500) or previously obtained.

The method (500) also comprises extracting (520) a trend map to be utilized in reconstructing image structure, for example, such as may resemble the extracted trend map 420 depicted in the example shown in FIG. 5. The extracted trends may correspond to various subterranean features, such as dips, laminated structures, and/or thin bed formations, among other examples. The trends may be reconstructed within gaps of the borehole image by extrapolating known data proximate the edges of a gap in an inward direction towards the center of the gap, as depicted by dashed arrows in the example shown in FIG. 8. That is, the trend extraction may be based on a filtering operation, such as may estimate missing data from the missing data boundary towards the center until the missing data is reconstructed.

The value $\hat{I}$ of a pixel located in the missing data gap at azimuthal position x and axial position y may be estimated based on the values I of a linear and/or other combination of a number N of proximate pixels i outside the missing data gap at azimuthal positions $x_i$ and axial positions $y_i$. For example, such estimation may utilize the equation set forth below:

$$\hat{I}(x, y) = \sum_{i \in N} I(x_i, y_i) w(d_i, \theta_i),$$

where the function $\omega(d_i, \theta_i)$ weights the contribution of each neighboring pixel i, and may thus define how the pixel located at azimuthal position x and axial position y may reconstructed as value $\hat{I}$. The weighting may be determined by $d_i$, a distance relating each known pixel i at azimuthal position $x_i$ and axial position $y_i$ to the location of the pixel being reconstructed, and $\theta_i$, relating each known structural feature corresponding to each known pixel i at azimuthal position $x_i$ and axial position $y_i$ to an estimated structural feature corresponding to the pixel being reconstructed.

Figure 8:
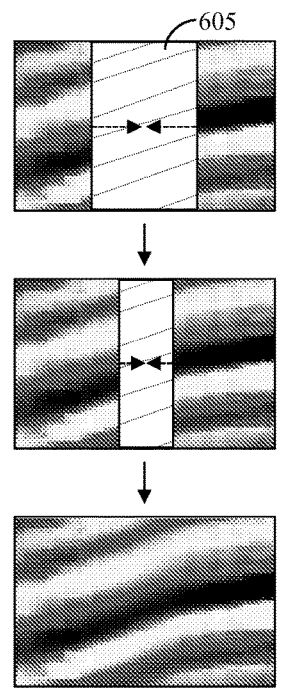
FIG. 8 is a flow-chart diagram depicting trend reconstruction according to one or more aspects of the present disclosure.
Figure 9:
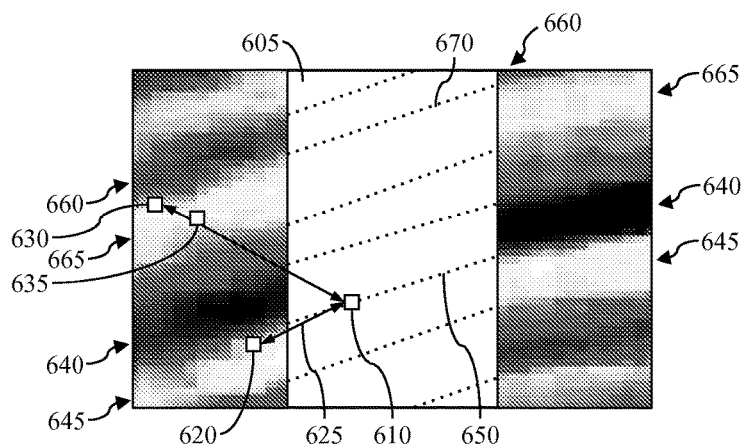
FIG. 9 is an enlarged view of a portion of FIG. 8.

For example, FIG. 9 is an enlarged view of the top image of FIG. 8 depicting an unknown pixel 610 within a missing data gap 605 being reconstructed, and two known pixels 620 and 630 as examples of the number N of proximate known pixels that may be utilized to reconstruct the unknown pixel 610. A distance 625 separates the known pixel 620 from the unknown pixel 610, and a distance 635 separates the known pixel 630 from the unknown pixel 610. The weighting function $\omega(d_i, \theta_i)$ may provide that closer known pixels have a greater weighting/contribution relative to more distant known pixels. Thus, from a distance perspective, the known pixel 620 may provide a greater contribution to the reconstruction of the unknown pixel 610 relative to the contribution provided by the known pixel 630. However, in addition to the relative proximity of known pixels to unknown pixels, the weighting contribution of each of the number N of known pixels may also depend on the relative proximity of each known pixel to a structural feature corresponding to the unknown pixel, as described below with respect to FIG. 9, which is an enlarged view of the top portion of FIG. 8.

As depicted in FIG. 9, the spatial relationships of structural features (dips, laminations, edges, vugs, etc.) to one or both sides of the gap 605 may be utilized to estimate locations of such structural features within the gap 605. Thus, a boundary between abutting structural features 640 and 645 on opposing sides of the gap 605 may be utilized to estimate a continuation 650 of such boundary. Similarly, a boundary between abutting structural features 660 and 665 on opposing sides of the gap 605 may be utilized to estimate a continuation 670 of such boundary.

The weighting function $\omega(d_i, \theta_i)$ may provide that known pixels located closer to the known formation structure corresponding to the estimated formation structure associated with the unknown pixel have a greater weighting/contribution relative to known pixels located further from the known formation structure corresponding to the estimated formation structure associated with the unknown pixel. Thus, in the example implementation depicted in FIG. 9, the unknown pixel 610 lies on or is otherwise associated with the estimated boundary 650 between the structural features 640 and 645, and the known pixel 620 is located relatively close to the corresponding boundary between the structural features 640 and 645. However, in contrast to the known pixel 620, the known pixel 630 is located much farther away from the boundary between the structure features 640 and 645. Accordingly, from a structural pertinence perspective, the contribution of the known pixel 620 will be greater than the contribution of the known pixel 630.

The weighting function $\omega$ itself may vary within the scope of the present disclosure, and may be based on one or more known distributions. For example, the weighting function $\omega$ may be selected to substantially resemble a Gaussian kernel. Of course, other criteria may also or instead be utilized to determine which pixels i are utilized to reconstruct the gap pixel 610, as well as distributions and/or functions other than a Gaussian kernel.

The trend extraction approach introduced herein has been shown to be effective in reconstructing the trend of features observed by a borehole imager tool. Moreover, the approach may have a low complexity relative to other options because it is based on a filtering operation. In addition, the approach exhibits little to no sensitivity to input parameters, which may minimize user (human) interaction.

Returning to FIG. 7, the acquired (510) incomplete image and extracted (520) trend map may be utilized to simulate (530) texture and/or high frequency components in the gaps of the incomplete image, and then a fullbore image may be reconstructed (540), such as may resemble the fullbore image 430 shown in FIG. 6.

The simulated texture may comprise high frequency image components, such as vugs and fractures in carbonates. The texture may correspond to the resistivity (e.g., microresistivity) and/or other formation characteristic measured by the borehole imager and/or other downhole tool, such as porosity, permeability, conductivity, and/or a nuclear characteristic, among other possibilities.

The texture simulation (530) may comprise a stochastic texture reconstruction utilizing the original texture measurement (from the originally acquired image) as training patterns. The simulation may randomly walk over the image gap pixel locations to find patterns that match or best match the neighboring measured textures, and the identified matches or best matches may then be pasted onto the corresponding gap area. One or more filters, for example, may be utilized to conduct the training pattern classification to achieve computation efficiency. The simulation (53) process may continue iteratively until the gap has been filled.

The previously extracted (520) trend map (such as in FIG. 8) may be utilized to guide such reconstruction when the best-matched textures are selected in the gaps. That is, the smooth, low frequency trend map extracted by the image processing approach described above may provide guidance with which high-resolution textures can be built.

The method (500) has been experimentally verified on a wide range of borehole images, including those obtained from deep water and carbonate environments. The experimental results indicate that the method (500) reconstructs fullbore images with data that matches the underlying borehole image. For example, FIG. 10 depicts an interval extending about six feet (or about 1.8 meters) along another example of an incomplete borehole image obtained according to one or more aspects shown and/or described in relation to one or more of FIGS. 1-3, and FIG. 11 depicts the same interval after processing according to one or more aspects of the present disclosure to convert the incomplete borehole image into a substantially completed, fullbore image.

In view of the entirety of the present disclosure, including FIGS. 1-11, a person having ordinary skill in the art will readily recognize that the present disclosure introduces a method comprising: acquiring a borehole image corresponding to a sidewall surface of a borehole that penetrates a subterranean formation, wherein the subterranean formation comprises structural elements and a varying geophysical characteristic, and wherein the borehole image comprises: structure corresponding to the structural elements; texture corresponding to the varying geophysical characteristic; and coverage gaps in which the structure and texture are missing; extracting trends from the borehole image, wherein the trends correspond to the structure; reconstructing the missing structure within the gaps based on the extracted trends; simulating the missing texture within the gaps based on the borehole image and the reconstructed structure; and constructing a fullbore image based on the borehole image, the reconstructed structure within the gaps, and the simulated texture within the gaps. The geophysical characteristic may be resistivity.

Acquiring the borehole image may comprise: positioning a borehole imager tool in the borehole proximate the subterranean formation, wherein the borehole imager tool is in communication with surface equipment disposed at a wellsite surface from which the borehole extends; and operating at least one of the borehole imager tool and the surface equipment to: obtain measurements of the geophysical characteristic around circumferential portions of the sidewall surface of the borehole; and construct the borehole image based on the measurements. The measurements may be selected from: gamma ray measurements; spontaneous potential measurements; resistivity measurements; density measurements; sonic measurements; caliper measurements; and NMR measurements.

The subterranean formation structural elements may comprise at least one dip, laminated structure, and/or thin bed formation.

Reconstructing the missing structure within the gaps may comprise, with respect to each gap, extrapolating data proximate edges of the gap in an inward direction towards the center of the gap.

Reconstructing the missing structure within the gaps may comprise individually reconstructing each of a plurality of pixels within each gap. Reconstructing each pixel within a gap may utilize a weighting function summing weighted contributions of a plurality of pixels of known structure proximate the pixel being reconstructed. The weighting function may be based on: the distance from the pixel being reconstructed to each proximate pixel of known structure; and the distance from each proximate pixel of known structure to a known structural element corresponding to an estimated structural element associated with the pixel being reconstructed.

Simulating the missing texture within the gaps may comprise performing a stochastic texture reconstruction utilizing the known texture.

The present disclosure also introduces a method comprising: positioning a downhole tool in a borehole proximate a subterranean formation penetrated by the borehole, wherein the subterranean formation comprises structural elements and a varying geophysical characteristic, and wherein the downhole tool is in communication with surface equipment disposed at a wellsite surface from which the borehole extends; and operating at least one of the downhole tool and the surface equipment to: acquire a borehole image corresponding to a sidewall surface of the borehole, wherein the borehole image comprises: structure corresponding to the structural elements; texture corresponding to the varying geophysical characteristic; and coverage gaps in which the structure and texture are missing; extract trends from the borehole image, wherein the trends correspond to the structure; reconstruct the missing structure within the gaps based on the extracted trends; simulate the missing texture within the gaps based on the borehole image and the reconstructed structure; and construct a fullbore image based on the borehole image, the reconstructed structure within the gaps, and the simulated texture within the gaps. The geophysical characteristic may be resistivity. Operating at least one of the downhole tool and the surface equipment to acquire the borehole image may comprise operating at least one of the downhole tool and the surface equipment to: obtain measurements of the geophysical characteristic around circumferential portions of the sidewall surface of the borehole; and construct the borehole image based on the measurements. The measurements may be selected from: gamma ray measurements; spontaneous potential measurements; resistivity measurements; density measurements; sonic measurements; caliper measurements; and NMR measurements.

The subterranean formation structural elements may comprise at least one dip, laminated structure, and/or thin bed formation.

Operating at least one of the downhole tool and the surface equipment to reconstruct the missing structure within the gaps may comprise operating at least one of the downhole tool and the surface equipment to, with respect to each gap, extrapolate data proximate edges of the gap in an inward direction towards the center of the gap.

Operating at least one of the downhole tool and the surface equipment to reconstruct the missing structure within the gaps may comprise operating at least one of the downhole tool and the surface equipment to individually reconstruct each of a plurality of pixels within each gap. Operating at least one of the downhole tool and the surface equipment to reconstruct each pixel within a gap may utilize a weighting function summing weighted contributions of a plurality of pixels of known structure proximate the pixel being reconstructed. The weighting function may be based on: the distance from the pixel being reconstructed to each proximate pixel of known structure; the distance from each proximate pixel of known structure to a known structural element corresponding to an estimated structural element associated with the pixel being reconstructed.

Operating at least one of the downhole tool and the surface equipment to simulate the missing texture within the gaps may comprise operating at least one of the downhole tool and the surface equipment to perform a stochastic texture reconstruction utilizing the known texture.

The present disclosure also introduces an apparatus comprising: a processor; and memory including computer program code; wherein the processor, the memory, and the computer program code are collectively operable to: acquire a borehole image corresponding to a sidewall surface of a borehole that penetrates a subterranean formation, wherein the subterranean formation comprises structural elements and a varying geophysical characteristic, and wherein the borehole image comprises: structure corresponding to the structural elements; texture corresponding to the varying geophysical characteristic; and coverage gaps in which the structure and texture are missing; extract trends from the borehole image, wherein the trends correspond to the structure; reconstruct the missing structure within the gaps based on the extracted trends; simulate the missing texture within the gaps based on the borehole image and the reconstructed structure; and construct a fullbore image based on the borehole image, the reconstructed structure within the gaps, and the simulated texture within the gaps. The apparatus may further comprise: a downhole tool conveyable within the borehole; and surface equipment disposed at a wellsite surface from which the borehole extends, wherein: the downhole tool and the surface equipment are communicably connected; and at least one of the downhole tool and the surface equipment comprises at least a portion of at least one the processor and the memory. The downhole tool may be conveyable within the borehole via wireline and/or drill string.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same goals and/or achieving similar aspects of the embodiments introduced herein. A person having ordinary skill in the art should also realize that such equivalent constructions do not depart from the scope of the present disclosure, and that they may make various changes, substitutions, and alterations without departing from the scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method, comprising:
acquiring a borehole image corresponding to a sidewall surface of a borehole that penetrates a subterranean formation, wherein the subterranean formation comprises structural elements and a varying geophysical characteristic, wherein the borehole image is based on measurement of the geophysical characteristic around circumferential portions of the sidewall surface of the borehole, and wherein the borehole image comprises:
structure corresponding to the structural elements;
texture corresponding to the varying geophysical characteristic; and
coverage gaps in which the structure and texture are missing; wherein the coverage gaps correspond to circumferential portions of the sidewall surface of the borehole for which no measurement of the geophysical characteristic was obtained,
extracting trends from the borehole image, wherein the trends correspond to low pass information of the image and representing the structure;
reconstructing the missing structure within the gaps based on the extracted trends;
simulating the missing texture within the gaps based on the borehole image and the reconstructed structure; and
constructing a fullbore image based on the borehole image, the reconstructed structure within the gaps, and the simulated texture within the gaps.

2. The method of claim 1 wherein the geophysical characteristic is resistivity.

3. The method of claim 1 wherein acquiring the borehole image comprises:
positioning a borehole imager tool in the borehole proximate the subterranean formation, wherein the borehole imager tool is in communication with surface equipment disposed at a wellsite surface from which the borehole extends; and
operating at least one of the borehole imager tool and the surface equipment to:
obtain measurements of the geophysical characteristic around circumferential portions of the sidewall surface of the borehole; and
construct the borehole image based on the measurements.

4. The method of claim 1 wherein reconstructing the missing structure within the gaps comprises, with respect to each gap, extrapolating data proximate edges of the gap in an inward direction towards the center of the gap.

5. The method of claim 1 reconstructing the missing structure within the gaps comprises individually reconstructing each of a plurality of pixels within each gap.

6. The method of claim 5 wherein reconstructing each pixel within a gap utilizes a weighting function summing weighted contributions of a plurality of pixels of known structure proximate the pixel being reconstructed.

7. The method of claim 5 wherein the weighting function is based on:
the distance from the pixel being reconstructed to each proximate pixel of known structure; and
the distance from each proximate pixel of known structure to a known structural element corresponding to an estimated structural element associated with the pixel being reconstructed.

8. The method of claim 1 wherein simulating the missing texture within the gaps comprises performing a stochastic texture reconstruction utilizing the known texture.

9. A method (500), comprising:
positioning a downhole tool in a borehole proximate a subterranean formation penetrated by the borehole, wherein the subterranean formation comprises structural elements and a varying geophysical characteristic, and wherein the downhole tool is in communication with surface equipment disposed at a wellsite surface from which the borehole extends; and
operating at least one of the downhole tool and the surface equipment to:
acquire (510) a borehole image corresponding to a sidewall surface of the borehole, wherein the borehole image is based on measurement of the geophysical characteristic around circumferential portions of the sidewall surface of the borehole wherein the borehole image comprises:
structure corresponding to the structural elements;
texture corresponding to the varying geophysical characteristic; and
coverage gaps in which the structure and texture are missing, wherein the coverage gaps correspond to circumferential portions of the sidewall surface of the borehole for which no measurement of the geophysical characteristic was obtained;
extract (520) trends from the borehole image, wherein the trends correspond to information of the image and represent the structure;
reconstruct (525) the missing structure within the gaps based on the extracted trends;
simulate (530) the missing texture within the gaps based on the borehole image and the reconstructed structure; and
construct (540) a fullbore image based on the borehole image, the reconstructed structure within the gaps, and the simulated texture within the gaps.

10. The method of claim 9 wherein the geophysical characteristic is resistivity.

11. The method of claim 10 wherein operating at least one of the downhole tool and the surface equipment to acquire the borehole image comprises operating at least one of the downhole tool and the surface equipment to:
obtain measurements of the geophysical characteristic around circumferential portions of the sidewall surface of the borehole; and
construct the borehole image based on the measurements.

12. The method of claim 9 wherein operating at least one of the downhole tool and the surface equipment to reconstruct the missing structure within the gaps comprises operating at least one of the downhole tool and the surface equipment to, with respect to each gap, extrapolate data proximate edges of the gap in an inward direction towards the center of the gap.

13. The method of claim 9 wherein operating at least one of the downhole tool and the surface equipment to reconstruct the missing structure within the gaps comprises operating at least one of the downhole tool and the surface equipment to individually reconstruct each of a plurality of pixels within each gap.

14. The method of claim 13 wherein operating at least one of the downhole tool and the surface equipment to reconstruct each pixel within a gap utilizes a weighting function summing weighted contributions of a plurality of pixels of known structure proximate the pixel being reconstructed.

15. The method of claim 14 wherein the weighting function is based on:
the distance from the pixel being reconstructed to each proximate pixel of known structure; and the distance from each proximate pixel of known structure to a known structural element corresponding to an estimated structural element associated with the pixel being reconstructed.

16. The method of claim 9 wherein operating at least one of the downhole tool and the surface equipment to simulate the missing texture within the gaps comprises operating at least one of the downhole tool and the surface equipment to perform a stochastic texture reconstruction utilizing the known texture.

17. An apparatus, comprising:
a processor; and
memory including computer program code;
wherein the processor, the memory, and the computer program code are collectively operable to:
acquire (510) a borehole image corresponding to a sidewall surface of a borehole that penetrates a subterranean formation, wherein the subterranean formation comprises structural elements and a varying geophysical characteristic, wherein the borehole image is based on measurement of the geophysical characteristic around circumferential portions of the sidewall surface of the borehole and wherein the borehole image comprises:
structure corresponding to the structural elements;
texture corresponding to the varying geophysical characteristic; and
coverage gaps in which the structure and texture are missing, wherein the coverage gaps correspond to circumferential portions of the sidewall surface of the borehole for which no measurement of the geophysical characteristic was obtained;
extract (520) trends from the borehole image, wherein the trends correspond to low pass information of the image representing the structure;
reconstruct (525) the missing structure within the gaps based on the extracted trends;
simulate (530) the missing texture within the gaps based on the borehole image and the reconstructed structure; and
construct (540) a fullbore image based on the borehole image, the reconstructed structure within the gaps, and the simulated texture within the gaps.

18. The apparatus of claim 17 further comprising:
a downhole tool conveyable within the borehole; and
surface equipment disposed at a wellsite surface from which the borehole extends, wherein:
the downhole tool and the surface equipment are communicably connected; and
at least one of the downhole tool and the surface equipment comprises at least a portion of at least one of the processor and the memory.

19. The apparatus of claim 18 wherein the downhole tool is conveyable within the borehole via wireline.

20. The apparatus of claim 18 wherein the downhole tool is conveyable within the borehole via drill string.

* * * * *